US008498625B2

(12) United States Patent
Trivi

(10) Patent No.: US 8,498,625 B2
(45) Date of Patent: Jul. 30, 2013

(54) ADVANCED VOICEMAIL FEATURES WITHOUT CARRIER VOICEMAIL SUPPORT

(75) Inventor: Jean-Michel Trivi, Boulder Creek, CA (US)

(73) Assignee: Google Inc., Mountain View, CA (US)

( * ) Notice: Subject to any disclaimer, the term of this patent is extended or adjusted under 35 U.S.C. 154(b) by 114 days.

(21) Appl. No.: 13/251,202

(22) Filed: Sep. 30, 2011

(65) Prior Publication Data

US 2012/0053938 A1  Mar. 1, 2012

Related U.S. Application Data

(63) Continuation of application No. 12/862,536, filed on Aug. 24, 2010.

(51) Int. Cl.
*H04L 12/58* (2006.01)
(52) U.S. Cl.
USPC ......... 455/413; 455/466; 455/412.1; 704/235
(58) Field of Classification Search
USPC .... 455/412.1, 413, 414.1, 412.2; 379/211.02, 379/88.18, 67.1, 412.1, 88.1; 704/236, 270, 704/275, 235
See application file for complete search history.

(56) References Cited

U.S. PATENT DOCUMENTS

| | | | |
|---|---|---|---|
| 5,003,574 A | 3/1991 | Denq et al. | |
| 5,742,736 A | 4/1998 | Haddock | |
| 5,748,974 A | 5/1998 | Johnson | |
| 5,832,171 A | 11/1998 | Heist | |
| 6,017,219 A | 1/2000 | Adams, Jr. et al. | |
| 6,282,510 B1 | 8/2001 | Bennett et al. | |
| 6,324,511 B1 | 11/2001 | Kiraly et al. | |
| 6,366,651 B1 | 4/2002 | Griffith et al. | |
| 6,421,645 B1 | 7/2002 | Beigi et al. | |
| 6,876,729 B1 | 4/2005 | Kuter et al. | |

(Continued)

FOREIGN PATENT DOCUMENTS

EP  1 126 436 A2  8/2001

OTHER PUBLICATIONS

Bacchiani, Michiel et al., "SCANMail: Audio Navigation in the Voicemail Domain," AT&T Labs, *HLT '01 Proceedings of the first Int'l conf. on Human language technology research*, 3 pages, Association for Computational Linguistics, Stroudsburg, PA (2001).

(Continued)

*Primary Examiner* — Mahendra Patel
(74) *Attorney, Agent, or Firm* — Leydig, Voit & Mayer, Ltd.

(57) ABSTRACT

In one embodiment, a communication request from a remote requester is intercepted at the computing device. Based on the intercepted communication request, one or more voicemail features are enabled at the computing device, independent of carrier voicemail support. The remote requester may be, for example, a caller or a voicemail server, and the intercepted communication request may be a phone call or a voicemail notification, respectively. In another embodiment, a system at a computing device coupled to a network includes a communication request handler and a voicemail manager. The communication request handler intercepts a communication request from a remote requester at the computing device. The intercepted communication request may be a voicemail notification from a network server or a phone call from a caller. The voicemail manager enables one or more voicemail features at the computing device, independent of carrier voicemail support, based on the intercepted communication request.

35 Claims, 8 Drawing Sheets

U.S. PATENT DOCUMENTS

| | | | |
|---|---|---|---|
| 6,912,581 | B2 | 6/2005 | Johnson et al. |
| 6,928,407 | B2 | 8/2005 | Ponceleon et al. |
| 7,092,496 | B1 | 8/2006 | Maes et al. |
| 7,117,152 | B1 | 10/2006 | Mukherji et al. |
| 7,270,546 | B1 | 9/2007 | Adams, Jr. et al. |
| 7,330,815 | B1 | 2/2008 | Jochumson |
| 7,386,452 | B1 | 6/2008 | Bates et al. |
| 7,412,643 | B1 | 8/2008 | Fischer et al. |
| 7,527,498 | B2 | 5/2009 | Matsoff |
| 7,590,536 | B2 | 9/2009 | Bates et al. |
| 7,729,478 | B1 | 6/2010 | Coughlan et al. |
| 7,782,365 | B2 | 8/2010 | Levien et al. |
| 2001/0031633 | A1 | 10/2001 | Tuomela et al. |
| 2005/0033753 | A1 | 2/2005 | Mundell et al. |
| 2005/0069095 | A1 | 3/2005 | Fellenstein et al. |
| 2005/0153718 | A1 | 7/2005 | Dolph |
| 2005/0176451 | A1* | 8/2005 | Helferich ............... 455/466 |
| 2006/0002521 | A1 | 1/2006 | Bettis et al. |
| 2006/0058049 | A1* | 3/2006 | McLaughlin et al. ........ 455/466 |
| 2006/0166658 | A1* | 7/2006 | Bennett et al. ............. 455/416 |
| 2006/0182232 | A1 | 8/2006 | Kerr et al. |
| 2006/0223502 | A1* | 10/2006 | Doulton ................. 455/413 |
| 2008/0013698 | A1 | 1/2008 | Holtzberg |
| 2008/0015846 | A1 | 1/2008 | Acero et al. |
| 2008/0240378 | A1 | 10/2008 | Pollock et al. |
| 2008/0273675 | A1 | 11/2008 | Siminoff |
| 2008/0312934 | A1 | 12/2008 | Cerra et al. |
| 2009/0141875 | A1 | 6/2009 | Demmitt et al. |
| 2009/0248415 | A1* | 10/2009 | Jablokov et al. ............. 704/251 |
| 2009/0276215 | A1 | 11/2009 | Hager |
| 2009/0319266 | A1 | 12/2009 | Brown et al. |
| 2009/0325603 | A1 | 12/2009 | Van Os et al. |
| 2010/0177877 | A1 | 7/2010 | Hamaker et al. |
| 2010/0183128 | A1* | 7/2010 | Logan et al. ............... 379/88.22 |
| 2011/0013756 | A1 | 1/2011 | Davies et al. |
| 2011/0269432 | A1* | 11/2011 | Abou Rjeili et al. ......... 455/413 |
| 2012/0020465 | A1 | 1/2012 | Davies et al. |

OTHER PUBLICATIONS

Bird, S., and Liberman, M., "A Formal Framework for Linguistic Annotation," Department of Computer and Information Science, University of Pennsylvania (expanded from version presented at ICSLP-98, Sydney, Australia), published Aug. 13, 1999, accessed at http://papers.ldc.upenn.edu/CIS9901_1999/revised_13Aug99.pdf, accessed on Mar. 26, 2012.

Kaminski, C., "Much Ado About Smart Tags," www.alistapart.com, published on Jul. 22, 2001, accessed at http://www.alistapart.com/articles/smarttags, accessed on Mar. 26, 2012.

Wactler, H., et al., "Complementary Video and Audio Analysis for Broadcast News Archives," in *Communications of the ACM*, vol. 43, No. 2, pp. 42-47, ACM (Feb. 2000).

Wikipedia, "Smart Tag (Microsoft)," www.wikipedia.com, accessed at http://en.wikipedia.org/wiki/Smart...tag_(Microsoft), accessed on Mar. 26, 2012.

Qi, W., et al., "Integrating Visual, Audio and Text Analysis for News Video," Institute of Electrical and Electronics Engineers, Inc. (IEEE), published in 2000, accessed at http://research.microsoft.com/apps/pubs/default.aspx?id=68777, accessed on Mar. 26, 2012.

International Search Report for International Application No. PCT/US2011/048979, Korean Intellectual Property Office, Republic of Korea, mailed Feb. 9, 2012.

\* cited by examiner

ADVANCED VOICEMAIL FEATURES WITHOUT CARRIER VOICEMAIL SUPPORT

This application is a continuation of U.S. application Ser. No. 12/862,536, filed Aug. 24, 2010, which is incorporated by reference herein in its entirety.

BACKGROUND

1. Field

The present invention relates to the field of voicemail messaging on a computing device.

2. Background

The emergence and development of voicemail systems has resolved many of the impediments to phone communications that occur when a user is unavailable to answer phone calls. Voicemail systems allow remote users to quickly and securely convey information to one another without being concerned with the availability of a particular user. These systems have long been associated with conventional telephone systems in home and business settings. However, the widespread use of personal computing devices, including but not limited to mobile phones, has led to increased reliance on these devices as a replacement for conventional telephones. Like conventional telephones, personal computing devices can also be used to send and receive voicemail messages. Therefore, users of personal computing devices generally rely on the features of the voicemail system provided by their communications network service provider, or carrier.

Communication in a voicemail system typically involves storing and retrieving voicemail messages stored in a centralized message storage area located at a carrier's voicemail server. For example, a phone call is routed to a carrier's voicemail server if a mobile phone user is unavailable to answer the call for whatever reason. The voicemail message from the caller is recorded as a digital audio file and stored at the carrier's voicemail server. A notification of the new voicemail message is then sent from the voicemail server to the mobile phone. Once the notification is received, the mobile phone user can retrieve the voicemail message by dialing a designated phone number to access the carrier's voicemail system using either the mobile phone or a conventional telephone. Additionally, a personal identification number or access code must first be entered by the user in order to use the carrier's voicemail system.

Different carriers provide different features relating to voicemail storage and retrieval. For example, carriers often provide voicemail notifications and the ability to use voicemail system features directly from a user's device. Some carriers also provide "Visual Voicemail" features that allow users to view a list of voicemail message entries and select all or a portion of particular messages for playback through a graphical user interface on the device. Some carriers may even provide more advanced features such as text transcription services that allow users to read text transcripts of voicemail messages delivered to the user via electronic mail or Short Message Service (SMS).

Therefore, users of personal computing devices are often limited to those voicemail features that are provided by their respective carrier. Alternatively, carriers must configure their voicemail systems to enable and support a particular voicemail feature for their respective users. In addition, a network connection between the personal computing device and the carrier's voicemail server is normally required in order to access the carrier's voicemail system. Thus, a user who is in an area with little or no network connectivity would be unable to retrieve voicemail messages or utilize other features of the voicemail system. Even if a network connection is available, carrier networks are susceptible to performance issues associated with large numbers of users connected to the network at the same time.

Users of personal computing devices need the ability to use advanced voicemail features, such as voice-to-text transcription, without having to depend on the carrier to support such features. These users also need the ability to use voicemail messaging features without being hampered by connectivity issues related to the carrier's network. From the carrier's perspective, there is a need to be able to offer communication services without having to make changes to the carrier's backend voicemail infrastructure to support new voicemail features as well as the multitude of users who need fast, reliable access to such features (and save system resources).

SUMMARY

Embodiments relate to a method at a computing device coupled to a network. In one embodiment, a communication request from a remote requester is intercepted at the computing device. Based on the intercepted communication request, one or more voicemail features are enabled at the computing device independent of carrier voicemail support. The intercepted communication request may be a voicemail notification request from a network server, in response to which the computing device automatically communicates with the network server to retrieve an incoming audio message. Alternatively, the intercepted communication request may be a phone call from a caller, in which case a prerecorded message is sent from the computing device to the caller after a configurable time-delay has elapsed.

In another embodiment, a system at a computing device coupled to a network includes a communication request handler and a voicemail manager. The communication request handler intercepts a communication request at the computing device from a remote requester. The voicemail manager enables one or more voicemail features at the computing device, independent of carrier voicemail support, based on the intercepted communication request. The intercepted communication request may be a voicemail notification from a network server or a phone call from a caller. If the communication request is a voicemail notification, the communication request handler may automatically communicate with the network server to retrieve an incoming audio message. If the communication request is a phone call, the communication request handler may send a prerecorded message to the caller after a time-delay has elapsed. The voicemail manager may further include a recorder to record an incoming audio message at a storage location and a translator to convert the recorded audio message into text metadata, annotate the recorded audio message with the text metadata, and store the annotated audio message at a storage location.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number. Further, the accompanying drawings, which are incorporated herein and form part of the specification, illustrate the embodiments of present invention and, together with the description, farther serve to explain the principles of the invention and to enable a person skilled in the relevant art(s) to make and use the invention.

DETAILED DESCRIPTION

Table of Contents

Figure 1:
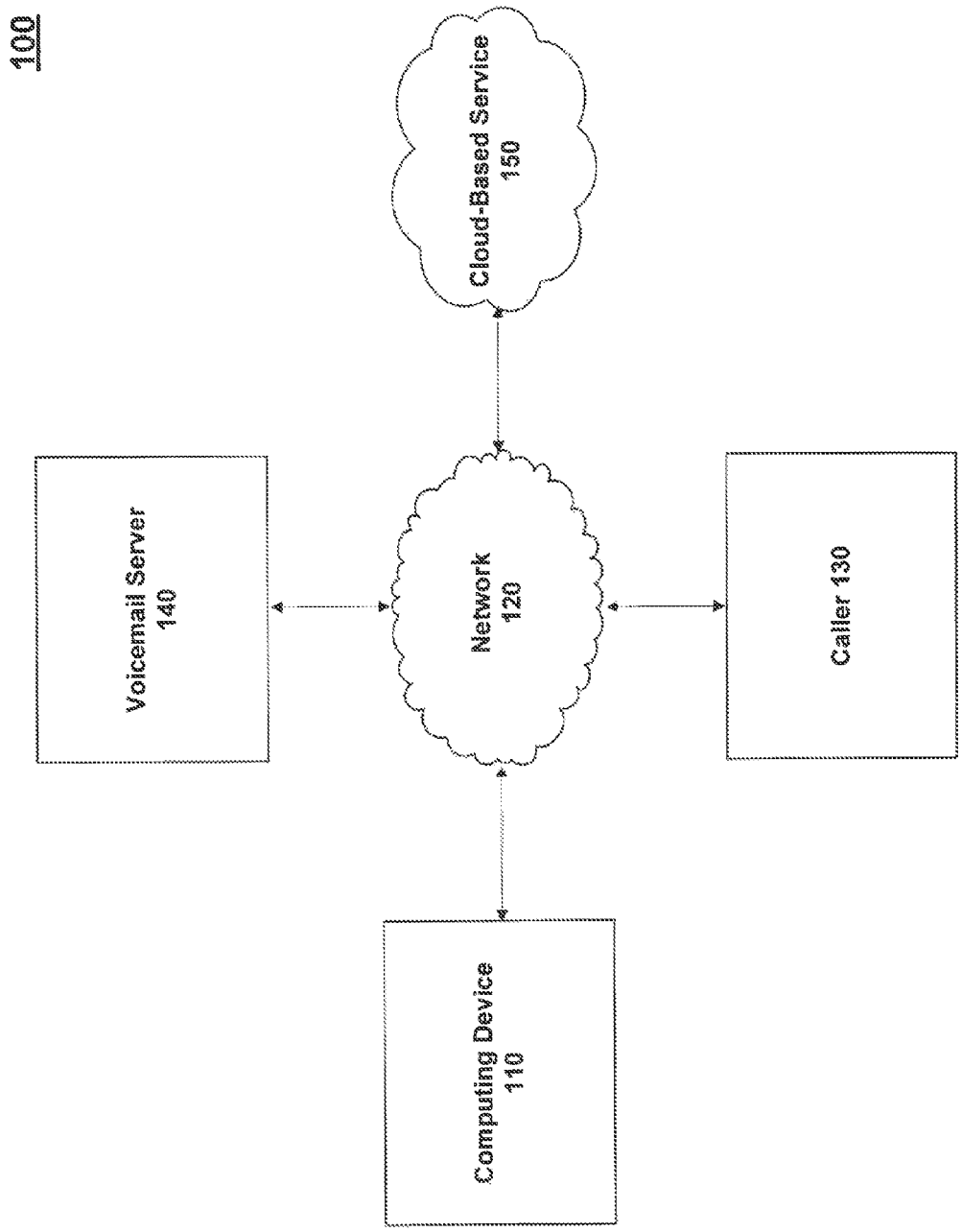
FIG. 1 is a diagram of an exemplary communication system in which embodiments can be implemented.

I. Introduction
II. System Overview
III. System Operation
   A. Phone Calls
   B. Voicemail Notifications
IV. Method
   A. Phone Calls
   B. Intercepted Voicemail Notifications
V. Example Computer System Implementation.
VI. Conclusion

I. INTRODUCTION

Embodiments relate to the field of voicemail messaging on a computing device, particularly to enabling voicemail features on a computing device independent of carrier voicemail features or support. Voicemail features that are enabled may include, but are not limited to: recording the incoming audio message from the network server or an incoming audio message from the caller at a storage location, converting the recorded audio message into text metadata, annotating the recorded audio message with the text metadata, and/or storing the annotated audio message at the computing device.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Embodiments relate to enabling voicemail features at a computing device independent of carrier voicemail support. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "carrier" is used herein to refer broadly and inclusively to any provider of communication services for the transmission of real-time voice communications. A carrier can be, for example and without limitation, a wireless service provider that provides services to mobile phone subscribers or a Voice over Internet Protocol (VoIP) service provider that provides services to subscribers who use a personal computer or similar computing device to make and receive phone calls. VoIP is used herein to refer broadly to the digital transmission of real-time voice communications over Internet Protocol (IP) networks such as the Internet or similar networks. Voicemail is typically one of the services provided and exclusively managed by a carrier.

The terms "call" and "phone call" are used interchangeably herein to refer broadly and inclusively to any communication request, for the transmission of real-time voice communication, from a remote requester, or "caller," over a network. A call or phone call can be, for example and without limitation, a communication request by one or more remote mobile phone users over a cellular network or a communication request by one or more remote personal computers user over a VoIP network. Further, such a communication request may correspond to a communication between multiple callers.

II. SYSTEM OVERVIEW

When a user is unavailable to answer a phone call, the user's computing device can intercept the phone call at the computing device and enable voicemail features at the computing device independent of the carrier's voicemail system and features. Enabling voicemail features independent of the carrier's voicemail system allows such features to be available for use without requiring any changes in the carrier's voicemail backend or infrastructure. This is particularly beneficial for new and advanced features, including but not limited to voice-to-text transcriptions of voicemail messages, transport control (skip, rewind, repeat), and book-marking messages during playback. Enabling voicemail features independent of the carrier's voicemail system also improves the playback experience for a user in situations when a network connection to a carrier's voicemail server is either unavailable or unreliable.

FIG. 1 is an illustration of an exemplary communication system 100 in which embodiments described herein can be implemented. Communication system 100 includes a computing device 110 that is communicatively coupled to caller 130, voicemail server 140, and cloud-based service 150 through network 120. Computing device 110 is coupled to network 120 through a communications interface. Computing device 110 can be any type of computing device having one or more processors, a user input (for example, a mouse, QWERTY keyboard, touch-screen, microphone, or a T9 keyboard), and a communications infrastructure capable of receiving and transmitting data over a network. For example, computing device 110 can include, but is not limited to, a mobile phone, a personal digital assistant (PDA), a computer, a cluster of computers, a set-top box, or other similar type of device capable of processing instructions and receiving and transmitting data to and from humans and other computing devices. Caller 130 can include, but is not limited to, a remote mobile phone user, a remote computer user, or other similar type of remote user requesting transmission of real-time voice communication. Voicemail server 140 can include, but is not limited to, a voicemail server, a VoIP/IP telephony server with voicemail features, or other similar type of server providing a voicemail application, protocol, framework, or service as would be apparent to a person skilled in the art given this detailed description. In addition, a person skilled in the art would appreciate that any voicemail operations performed by voicemail server 140 may occur at a single server operated by a carrier or may be distributed by the carrier across multiple servers.

Cloud-based service 150 can be any computing resource or service, provided by one or more cloud computing devices, shared over a network. Such computing resources can include, but are not limited to, one or more storage devices that are integrated with or separate from the cloud computing devices. Examples of cloud computing devices include, but are not limited to, a central processing unit, an application-specific integrated circuit, or other type of cloud computing device having at least one processor and memory. Cloud services performed by the one or more cloud computing devices include, but are not limited to, information storage and retrieval and voice-to-text transcription. Other cloud services that could be performed by cloud computing devices would be apparent to a person of ordinary skill in the relevant art. In addition, the advantages to using cloud services, such as cloud-based storage and cloud-based voice to text transcription would be apparent to a person of ordinary skill in the relevant art.

Network 120 can be any network or combination of networks that can carry data communication, and may be referred to herein as a carrier network. Such network 120 can include, but is not limited to, a wired (e.g., Ethernet) or a wireless (e.g., Wi-Fi and 3G) network. In addition, network 120 can include, but is not limited to, a local area network, medium area network, and/or wide area network such as the Internet. Network 120 can support protocols and technology including, but not limited to, Internet or World Wide Web protocols and/or services. Intermediate network routers, gateways, or servers may be provided between components of communication system 100 depending upon a particular application or environment.

Figure 2:
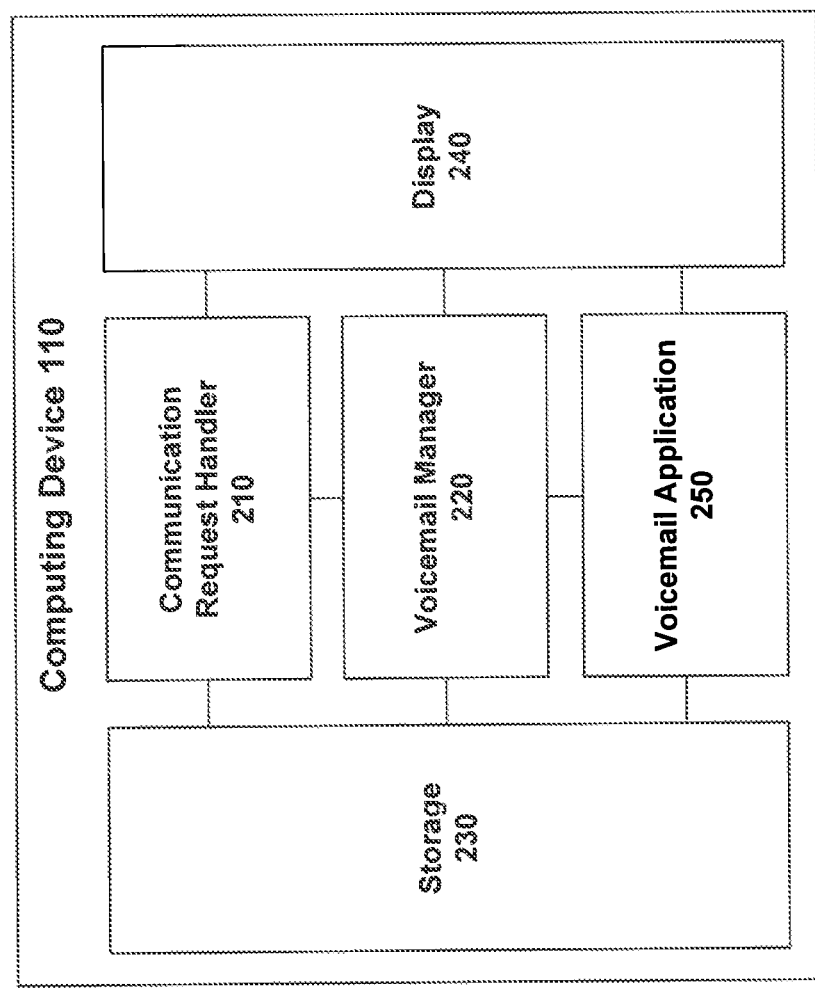
FIG. 2 is a diagram of an embodiment of an exemplary computing device.

FIG. 2 is an illustration of an embodiment of computing device 110. Computing device 110 includes communication request handler 210, voicemail manager 220, storage 230, display 240, and voicemail application 250. As will be described in further detail below, communication request handler 210 may be coupled to voicemail manager 220, storage 230, and display 240, according to an embodiment. Voicemail manager 220 may be coupled to communication request handler 210, storage 230, display 240, and voicemail application 250, according to an embodiment. The couplings between storage 230 and each of communication request handler 210, voicemail manager 220, and voicemail application 250 may exist as a direct connection or may exist as an indirect connection through network 120 of FIG. 1. Further, storage 230 may be located at the same or a different location than communication request handler 210, voicemail manager 220, and voicemail application 250.

Figure 3:
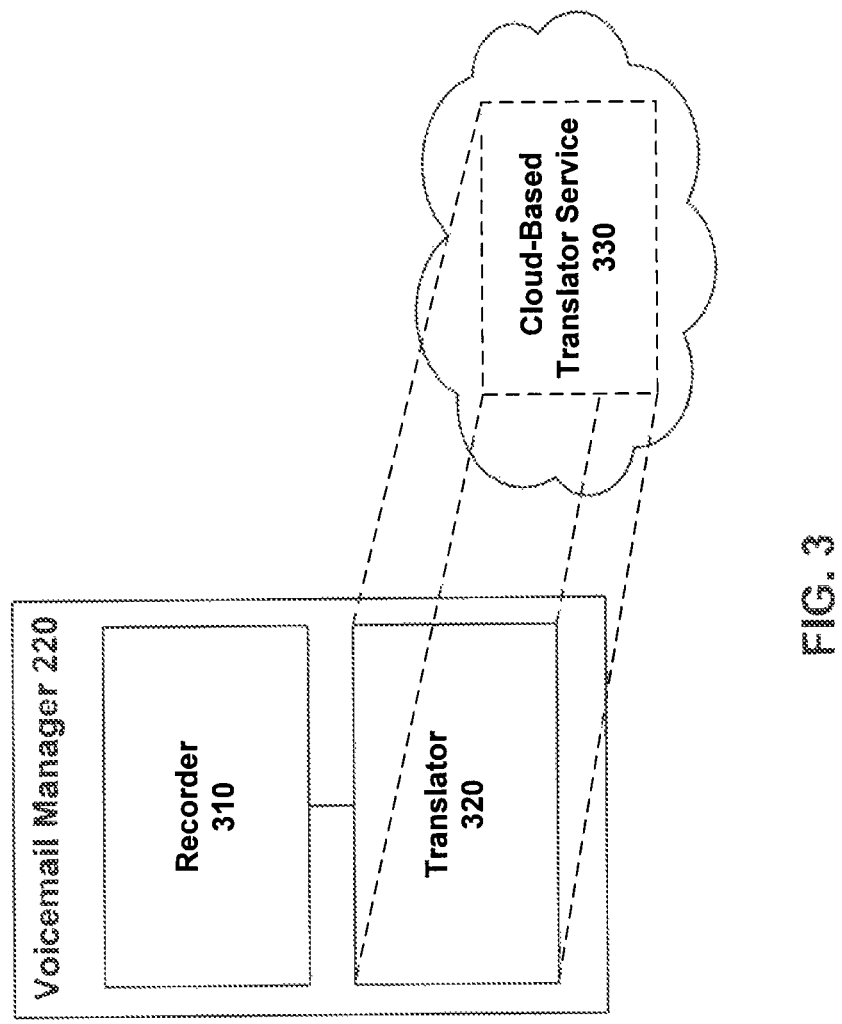
FIG. 3 is a diagram of an embodiment of an exemplary voicemail manager.

FIG. 3 is a diagram of an embodiment of voicemail manager 220. Voicemail manager 220 further includes recorder 310 and translator 320. In an embodiment, translator 320 is coupled to recorder 310 as a direct or indirect connection at the same location as recorder 310 and voicemail manager 220. In another embodiment, translator 320 may be implemented as cloud-based translator service 330. For example, cloud-based translator service 330 may be included as part of cloud-based service 150 in FIG. 1. In this example, cloud-based translator service 330 would be coupled to recorder 310 as an indirect connection through network 120.

Referring back to FIG. 2, communication request handler 210, voicemail manager 220, including its components (recorder 222 and translator 224), and voicemail application 250 can be implemented in software, firmware, hardware, or any combination thereof. Embodiments of communication request handler 210, voicemail manager 220, including its components (recorder 222 and translator 224), and voicemail application 250, or portions thereof, can also be implemented to run on any type of processing device including, but not limited to, a computer, workstation, embedded system, networked device, mobile device, or other type of processor or computer system capable of carrying out the functionality described herein.

In an embodiment, storage 230 is used to store data and/or other information accessible by computing device 110. Information stored in storage 230 includes, but is not limited to, one or more digital audio files including voicemail messages, prerecorded voice messages, or ring tones. Storage 230 may be any type of recording medium coupled to an integrated circuit that controls access to the recording medium. The recording medium can be, for example and without limitation, a semiconductor memory, a hard disk, or other similar type of memory or storage device. Moreover, storage 230 may be a local data store that is integrated within computing device 110, a stand-alone device communicatively coupled to computing device 110 via a direct connection, or a cloud-based storage location coupled to computing device 110 over network 120.

For example, if storage 230 is integrated on the same device as computing device 110, an internal bus of computing device 110 may be used to communicatively couple storage 230 to each of communication request handler 210 and voicemail manager 220. In another example, if storage 230 is cloud-based, network 120 may be used to communicatively coupled storage 230 to each of communication request handler 210 and voicemail manager 220. Further, a cloud-based storage 230 may be implemented as one or more separate or shared memory components of a cloud computing environment such as, but not limited, one or more cloud computing devices having multiple processors and memory components incorporated in a clustered cloud computing environment. The cloud computing process performed by the clustered cloud computing environment may be carried out across multiple processors located at the same or different locations. The use and advantages of cloud-based storage and computing would be apparent to a person skilled in the art given this detailed description.

III. SYSTEM OPERATION

In operation, communication request handler 210 of FIG. 2 is configured to intercept a communication request from caller 130 of FIG. 1 to computing device 110 via network 120, according to an embodiment. Alternatively, communication request handler 210 can intercept a communication request from voicemail server 140 of FIG. 1, according to an embodiment. For example, the communication request from caller 130 may be a phone call. The communication request from voicemail server 140 may be a voicemail notification. Based on the intercepted communication request, voicemail manager 220 enables one or more voicemail features at computing device 110.

A. Phone Calls

In an embodiment, communication request handler 210 is configured to intercept, with or without user intervention, a phone call from caller 130 to computing device 110 via network 120. When the call is received at computing device 110, the user is generally notified of the incoming call by an audible ring tone or a visual notification that is displayed by display 240. The user notification process is well known to a person skilled in the relevant art given this detailed description.

For example, upon notification of the incoming call, the user may choose to answer the call. If the call is answered, a connection to exchange real-time voice communications is established with caller 130 over network 120. In another example, the user may choose to allow communication request handler 210 to intercept the phone call through user input at computing device 110 (for example, by pressing a button or selecting a key of a keyboard at computing device 110). In a further example, the user may be unavailable or at a different location than computing device 110 when the call is received. Communication request handler 210 will then automatically intercept the call.

The interception of the call by communication request handler 210 occurs independently of the carrier and carrier voicemail support. In addition, the interception of the call occurs before the call is directed to the carrier's voicemail system, which generally occurs if the user at computing device 110 does not answer the call after a certain amount of time has elapsed. When communication request handler 210 intercepts the call, a connection to exchange real-time voice communications is established with caller 130 over network 120. The connection established upon the interception of the call by communication request handler 210 is the same connection that would be established if the user had answered. In that regard, for the carrier and the carrier's voicemail system, the call appears as having been answered at computing device 110. Consequently, the carrier's voicemail system is circumvented and voicemail features are provided at computing device 110 independent of the carrier's voicemail system.

In response to interception of the phone call (for example, by user input or automatically, without any user intervention), communication request handler 210 sends a prerecorded message to caller 130 after a configurable time-delay has elapsed. The configurable time-delay is a setting that the user can configure at computing device 110 in advance of receipt of the phone call. The configurable time-delay allows the user to specify a length of time before communication request handler 210 intercepts the phone call and initiates voicemail features at computing device 110. The prerecorded message sent by communication request handler 210 may be, for example, a standard voicemail greeting in the user's voice that gets sent or played to caller 130, according to an embodiment. The prerecorded message may be recorded, in advance of the call, by a user at computing device 110 using an input device such as, for example, a microphone coupled to computing device 110. The user's recorded message may be stored at storage 230 as a digital audio file, which can be accessed and retrieved by communication request handler 210 at a later time. As discussed above, storage 230 may be integrated with computing device 110 or cloud-based. The prerecorded message will generally prompt caller 130 to leave a voicemail message after a period of time, the end of which may be signified by an audio signal (e.g., a beep that is played in typical voicemail messaging systems).

In an embodiment, communication request handler 210 is configured to determine whether caller 130 is an identifiable or known caller and further configured to send a customized, or caller-specific, message to the identifiable or known caller. To determine whether the caller is an identifiable or known caller, communication request handler 210 may compare the phone number of the caller to a list of phone numbers of identifiable or known callers (e.g., list of contacts) stored at computing device 110 (e.g., in storage 230). If communication request handler 210 determines that caller 130 is an identifiable or known caller, communication request handler 210 is further configured to determine whether a caller-specific message is associated with the identifiable or known caller. For example, a caller-specific message, in addition to other information including, but not limited to, a contact name and phone number, may be associated with each known caller and stored at computing device 110. This information may be input by the user using an input device coupled to computing device 110. Such input devices may include, but are not limited to, a keyboard or touchpad for text entry information and a microphone for audio. In addition, the input device may be used by the user to associate a caller-specific message with a particular contact name and phone number at computing device 110.

If caller 130 is an identifiable or known caller and a caller-specific message is available, communication request handler 210 can send the caller-specific message, as opposed to the prerecorded message, to caller 130. The caller-specific message may be a digital audio file stored at computing device 110, similar to the prerecorded message, but customized specifically for the identifiable or known caller. For example, the caller-specific message may be a voicemail greeting containing the name of the identifiable or known caller along with information the user wishes to convey only to that identifiable or known caller. Like the prerecorded message, the caller-specific message may be recorded by a user at computing device 110 using an input device such as, for example, a microphone coupled to computing device 110. The prerecorded message and the caller-specific message may be generated at computing device 110 or may be generated using a device external to computing device 110 and transferred to computing device 110. These messages may be transferred to computing device 110 using any number of well-known methods for transferring digital files between different devices.

In an embodiment, communication request handler 210 is configured to determine whether caller 130 is an identifiable or known caller, as described above, and further configured to send a custom ring-back tone to caller 130 and play a custom ringtone at computing device 110. The custom ring-back tone and custom ringtone are customizable by the user for each identifiable or known caller stored at computing device 110. If caller 130 is an identifiable or known caller, communication request handler 210 is configured to determine whether a custom ring-back tone and/or a custom ringtone are available, according to an embodiment. Like the caller-specific message described above, a custom ring-back tone, a custom ringtone, or both may be associated with each identifiable or known caller. As described above, this association in addition to other information pertaining to each caller, including, but not limited, the caller's name and phone number, may be stored at computing device 110. The custom ring-back tone and the custom ringtone may be stored at computing device 110 as digital music files in any number of formats including, but not limited to, MPEG-1 Audio Layer 3 ("MP3"), Waveform Audio File Format ("WAV"), and Musical Instrument Digital Interface ("MIDI"). One skilled in the relevant art given this description would appreciate other types of digital audio formats that may be used to store the custom ring-back tone and custom ringtone files.

If communication request handler 210 determines that a custom ring-back tone is associated with the identifiable or known caller, the custom ring-back tone is sent to the identifiable or known caller. If communication request handler 210 determines that a custom ringtone is associated with the identifiable or known caller, the custom ringtone is played at computing device 110. For example, the custom ring-back tone, received by the identifiable or known caller, may be played through a speaker device coupled to a computing device operated by the identifiable or known caller. In addition, the custom ringtone may be played through a speaker device coupled to computing device 110.

The custom ring-back tone and the custom ringtone are not mutually exclusive. For example, a custom ring-back tone may be associated with an identifiable or known caller while a custom ringtone may not. Alternatively, a custom ringtone may be associated with an identifiable or known caller while a custom ring-back tone may not. In other examples, both a custom ring-back tone and a custom ringtone may be associated with an identifiable or known caller. In addition, although a ring-back tone and a ringtone may be associated with a caller, it should be appreciated the same ring-back tone and/or ringtone may be used for multiple identifiable or known callers, depending on the preference of the user.

One skilled in the relevant art would recognize the custom ring-back tone and the custom ringtone might be generated using any number of well-known applications for generating ring tones. One skilled in the relevant art would also recognize the custom ring-back tone and custom ringtone may be generated by the user at computing device 110 or may be generated at a device external to computing device 110 and transferred by the user to computing device 110 once generated. In addition, one skilled the relevant art would appreciate these messages may be transferred to computing device 110 using any number of well-known methods for transferring digital files between different devices.

In response to the prerecorded message or the caller-specific message sent by communication request handler 210, caller 130 will typically send a voicemail message in the form of voice signals from a computing device, separate and apart from computing device 110, operated by caller 130. For example, caller 130 may input voice signals through a microphone at the computing device operated by caller 130. Recorder 310 of FIG. 3 is configured to record the incoming audio stream, received at communication device 110, from caller 130. The audio stream from caller 130 may be recorded and stored by recorder 310 at storage 230.

In an embodiment, translator 320 of FIG. 3 is configured to convert the audio stream, or audio message, from caller 130 and recorded by recorder 310 into text metadata. The text metadata includes translated text corresponding to each word spoken in the recorder audio message. The text metadata corresponding to the recorded audio message from caller 130 is stored at storage 230. It would be apparent to a person of ordinary skill in the art that a variety of standardized and/or proprietary formats may be used for converting and storing the recorded audio message into text metadata. An example of such a format is the VoiceXML ("VXML") standard maintained by the World Wide Web Consortium, or W3C.

In an embodiment, translator 320 is further configured to annotate the recorded audio message with text metadata. Translator 320 may annotate the recorded audio message using one of several techniques known in the relevant art. For example, translator 320 may generate and store text metadata for a recorded audio message by associating a VXML tag with each word or group of words in a text metafile derived from the audio message. In addition, each word or group may have an associated time stamp, code, or location corresponding to a point in time at which the word(s) is spoken or can be played back in the recorded audio message. In an embodiment, translator 320 is configured to store the annotated audio message at storage 230.

In an embodiment, could-based translator service 330 is configured to perform the conversion and annotation of the recorded audio message. In an embodiment, cloud-based translator service 330 is configured to retrieve the recorded audio message from a cloud-based storage location. In a different embodiment, cloud-based translator service 330 is configured to retrieve the recorded audio message from a storage location at computing device 110. The embodiments correspond to storage 230, which may be configured to be cloud-based or at computing device 110.

In an embodiment, display 240 of FIG. 2 is configured to display a voicemail-receipt notification. Once recorder 310 records the audio message from caller 130, voicemail manager 220 may be configured to send a notification of the audio message to display 240. For example, once recorder 310 completes recording the audio message from caller 130, voicemail manager 220 may generate a notification of a new voicemail message, which may be made available for the user to access via a user interface at computing device 110.

In an embodiment, the text transcription of the annotated audio message stored at storage 230 is based on the text metadata, described above. In an embodiment, the text transcription is graphically displayed by voicemail manager 220 using display 240 (e.g., a touch-screen LCD at computing device 110). In a further embodiment, voicemail manager 220 may be configured to graphically display a progress marker for the text transcription using display 240 during playback of the annotated audio message. The progress marker may be any type of visual indicator that can be used to indicate to the user at computing device 110 the word or group of words being currently played during playback of the annotated audio message. The relative position of the visual progress marker in the graphically displayed text transcription may be updated as necessary during playback of the annotated audio message.

In an embodiment, voicemail manager 220 may be configured to graphically display a timeline, based on the annotated audio message, illustrating the word distribution of the text transcription using display 240. For example, voicemail manager 220 can use the text metadata of the annotated audio message to identify a timeline position of each word of the text transcription relative to the audio message. In a further embodiment, the progress marker may be used in conjunction with a visual timeline that includes the word distribution corresponding to the text transcription of the recorded audio message. A person skilled in the relevant art given this detailed description would appreciate that any number of graphical formats, representations, and/or visualization techniques may be utilized to graphically display or present the timeline, the text transcription, and/or the visual progress marker using display 240.

In an embodiment, voicemail application 250 is configured to process the annotated audio message stored in storage 230. Voicemail application 250 may be any one or combination of a variety of applications for processing the annotated audio message at computing device 110. Such applications may include, but are not limited to, simple playback of the message with timeline navigation, audio cropping of relevant portions for the user, book-marking various portions of the message, converting audio messages to text, displaying a text transcription with a progress marker during voicemail playback, and sharing and export features.

In an embodiment, voicemail application 250 may use display 240 in conjunction with a graphical user interface at computing device 110 to perform one or more of the above-described applications. These and other applications for processing voicemail audio messages at computing device 110 by voicemail application 250 would be apparent to a person of ordinary skill in the relevant art given this detailed description.

B. Voicemail Notifications

In an embodiment, communication request handler 210 is configured to intercept a voicemail notification from voicemail server 140. The voicemail notification is used by voicemail server 140 to notify a user at computing device 110 of a new voicemail message received at voicemail server 140. Voicemail messages are received at voicemail server 140 during instances when computing device 110 is not connected to network 120. Such instances may include computing device 110 being in a powered-off state or computing device 110 being physically moved to a location where establishing a connection between computing device 110 and network 120 would not be possible. For example, the user of a mobile phone may shut the device off manually, may not have a sufficiently charged battery to power the device, or may be located in an area outside the transmission range of the carrier's network. During such instances, caller 130 would be directed to the carrier's voicemail system to leave voicemail messages for the user as in traditional communication systems. Any voicemail messages received at voicemail server 140 are stored at voicemail server 140 or other network server operated and designated by the carrier.

When computing device 110 reestablishes a connection to network 120 (e.g., when computing device 110 is powered on or moved to a location where a connection to network 120 can be established), voicemail server 140 typically sends a voicemail notification corresponding to one or more new voicemail messages received at voicemail server 140 (i.e., during the period of time that computing device 110 was not connected to network 120 and therefore, could not enable voicemail features for caller 130). Upon receipt of the voicemail notification from voicemail server 140, communication request handler 210 is configured to automatically communicate with voicemail server 140 to retrieve the one or more voicemail messages stored at voicemail server 140.

As described above for voicemail audio messages from caller 130, recorder 310 of voicemail manager 220 is configured to record the incoming voicemail audio message from voicemail server 140. In an embodiment, the user may manually call the carrier's voicemail system to establish a connection with voicemail server 140, in which case recorder 310 is configured to record the voicemail message as the user listens to the message. In that regard, recorder 310 may be configured to record the voicemail message automatically or upon request by the user. One skilled in the relevant art would appreciate recorder 310 may record multiple audio messages depending on the number of voicemail messages stored at voicemail server 140.

In an embodiment, translator 320 or cloud-based translator service 330 may be configured to convert and annotate the recorded voicemail audio message(s), as described above. In an embodiment, display 240 may be configured to display a notification to a user, as described above. Also as described above, voicemail application 250 may be configured to process the voicemail message(s), according to an embodiment.

IV. METHOD

A. Phone Calls

Figure 4:
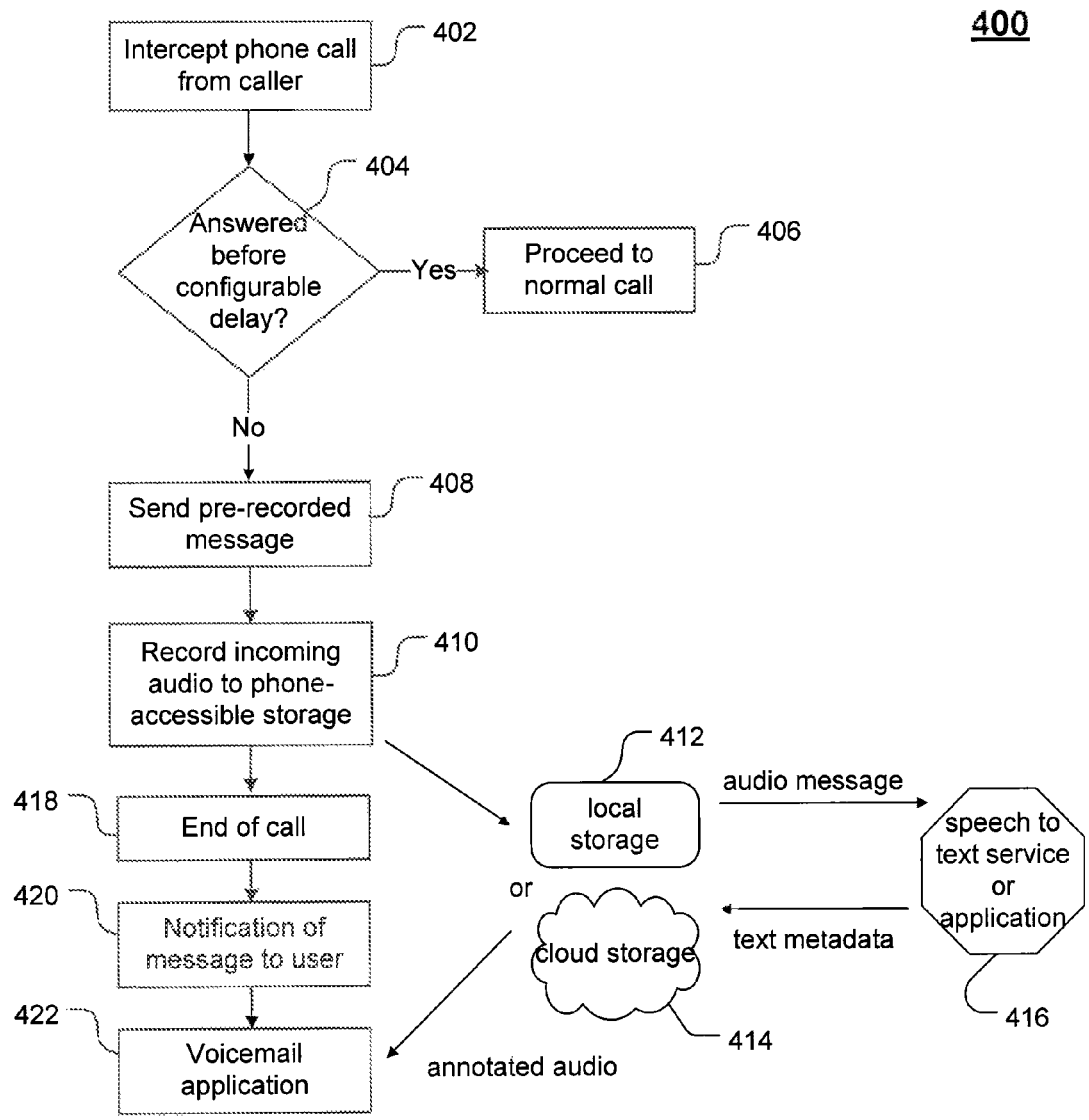
FIG. 4 is a flowchart of an embodiment of an exemplary method for enabling voicemail features at a computing device upon intercepting a call from a caller at a computing device.

FIG. 4 is a process flowchart of a method 400 for enabling voicemail features at a computing device, independent of carrier voicemail features or support, upon intercepting a phone call from a caller at a computing device. Method 400 includes steps 402, 404, 406, 408, 410, 412, 414, 416, 418, 420, and 422. Benefits of method 400 include, but are not limited to, a faster, more efficient, and more reliable voicemail playback experience for users of computing devices who no longer have to rely on a carrier to support desired voicemail features.

For ease of explanation, system 100 of FIG. 1, as described above, will be used to describe method 400, but is not intended to be limited thereto. Further, for ease of explanation, method 400 will be described in the context of a mobile phone device (e.g., computing device 110 of FIG. 1). The mobile phone device is communicatively coupled to a voicemail server (e.g., voicemail server 140 of FIG. 1) via a communications network (e.g., network 120 of FIG. 1). Based on the description herein, a person of ordinary skill in the relevant art will recognize that method 400 can be executed on other types of client devices such as, for example and without limitation, a PDA, a laptop or personal computer, and similar types of devices capable of receiving voicemail notifications via a communications network. These other types of client devices are within the scope and spirit of the embodiments described herein.

Method 400 begins in step 402, which includes intercepting a phone call from a caller. The phone call is from a caller (e.g., caller 130 of FIG. 1). In this context, the caller may be, for example, another mobile phone user or a user of a traditional telephone. The phone call is intercepted at the mobile phone. Step 402 may be performed by, for example, communication request handler 210 of FIG. 2.

Method 400 proceeds to step 404, which determines whether the call is answered before a configurable time-delay has elapsed or not. As described above, the configurable time-delay may signify, for example, the time in which a user of the mobile phone may answer the call. If the user answers the call before the configurable time-delay has elapsed, method 400 proceeds to step 406, which proceeds to a normal call (e.g., a connection to exchange real-time voice communications is established between the caller and the user of the mobile phone). If the user fails to answer the call before the configurable time-delay has elapsed (e.g., for reasons described above), method 400 proceeds to step 408. In step 408, a pre-recorded message is sent to the caller. As described above, the pre-recorded message may be a digital audio file stored in storage 230 of FIG. 2. The content of the audio file may be a standard voicemail greeting recorded in the user's voice, similar to voicemail greetings associated with traditional voicemail systems.

Figure 5:
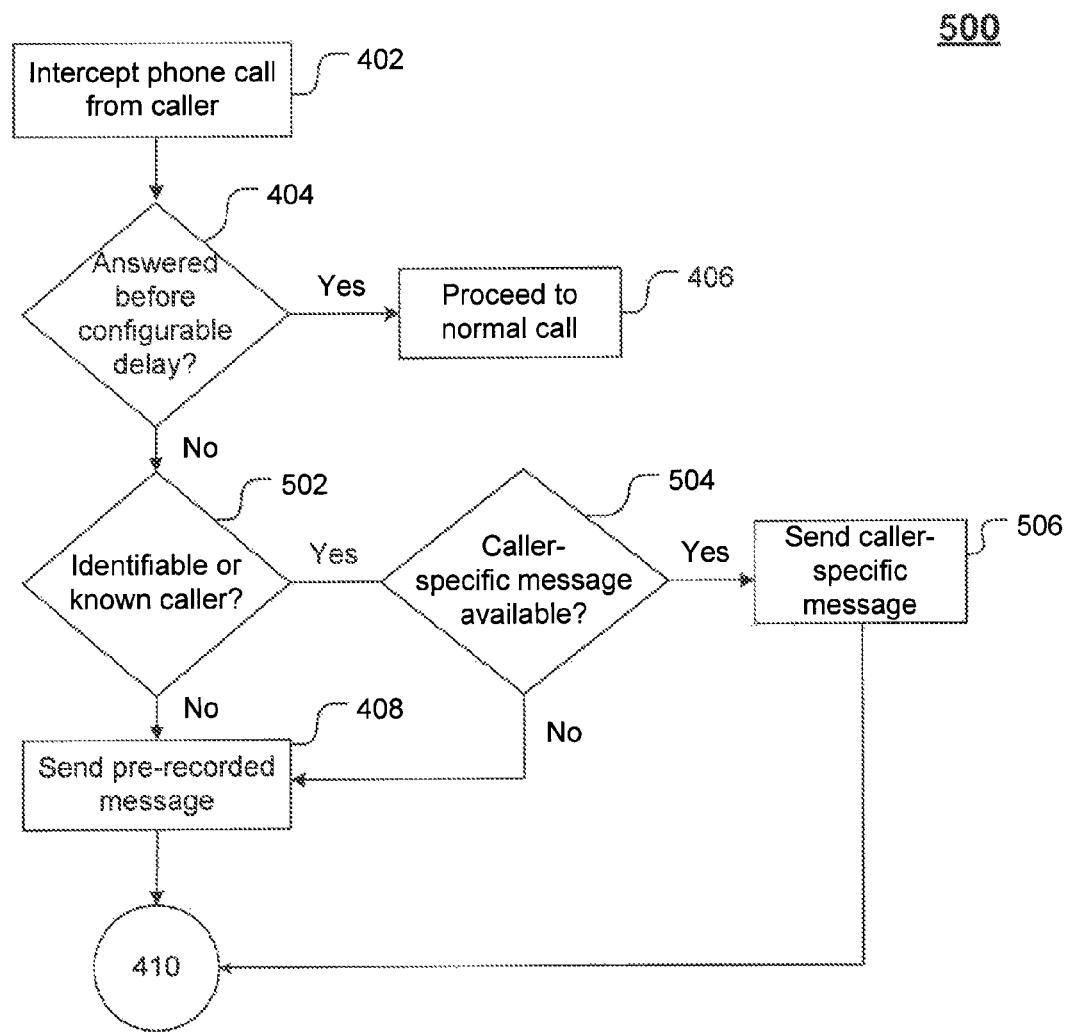
FIG. 5 is a flowchart of an embodiment of an exemplary method for enabling voicemail features at a computing device upon intercepting a call from an identifiable or known caller at a computing device.

In further embodiments, method 400 includes additional steps before proceeding to step 410. FIG. 5 is a process flowchart of a method 500 for intercepting a call from a caller at a computing device (e.g., a mobile phone as used in method 400), according to an embodiment. Method 500 includes steps 502, 504, and 506 in addition to steps 402, 404, 406, and 408 of method 400 of FIG. 4. Like method 400, method 500 begins in step 402, in which a call from a caller is intercepted (e.g., by communication request handler 210 of FIG. 2). Also like method 400, method 500 proceeds to step 406 if the call is answered before the configurable time delay has elapsed. However, method 500 proceeds to step 502 if the call is not answered before the configurable time delay has elapsed. Step 502 includes determining whether the caller is an identifiable or known caller. If the caller is not an identifiable or known caller, method 500 proceeds to step 408, which includes sending a prerecorded message to the caller, as in method 400 described above. However, if the caller is an identifiable or known caller, method 500 proceeds to step 504, which includes determining whether a caller-specific message is available. If it is determined in step 504 that a caller-specific message is not available, method 500 proceeds to step 408, in which the default prerecorded message is sent to the identifiable or known caller. If it is determined in step 504 that a caller specific message is available, method 500 proceeds to step 506, in which the caller-specific message is sent to the identifiable or known caller. After steps 408 and 506, method 500 concludes at step 410 of method 400. The steps of method 500 may be performed by, for example, communication request handler 210 of FIG. 2, as described above.

Figure 6:
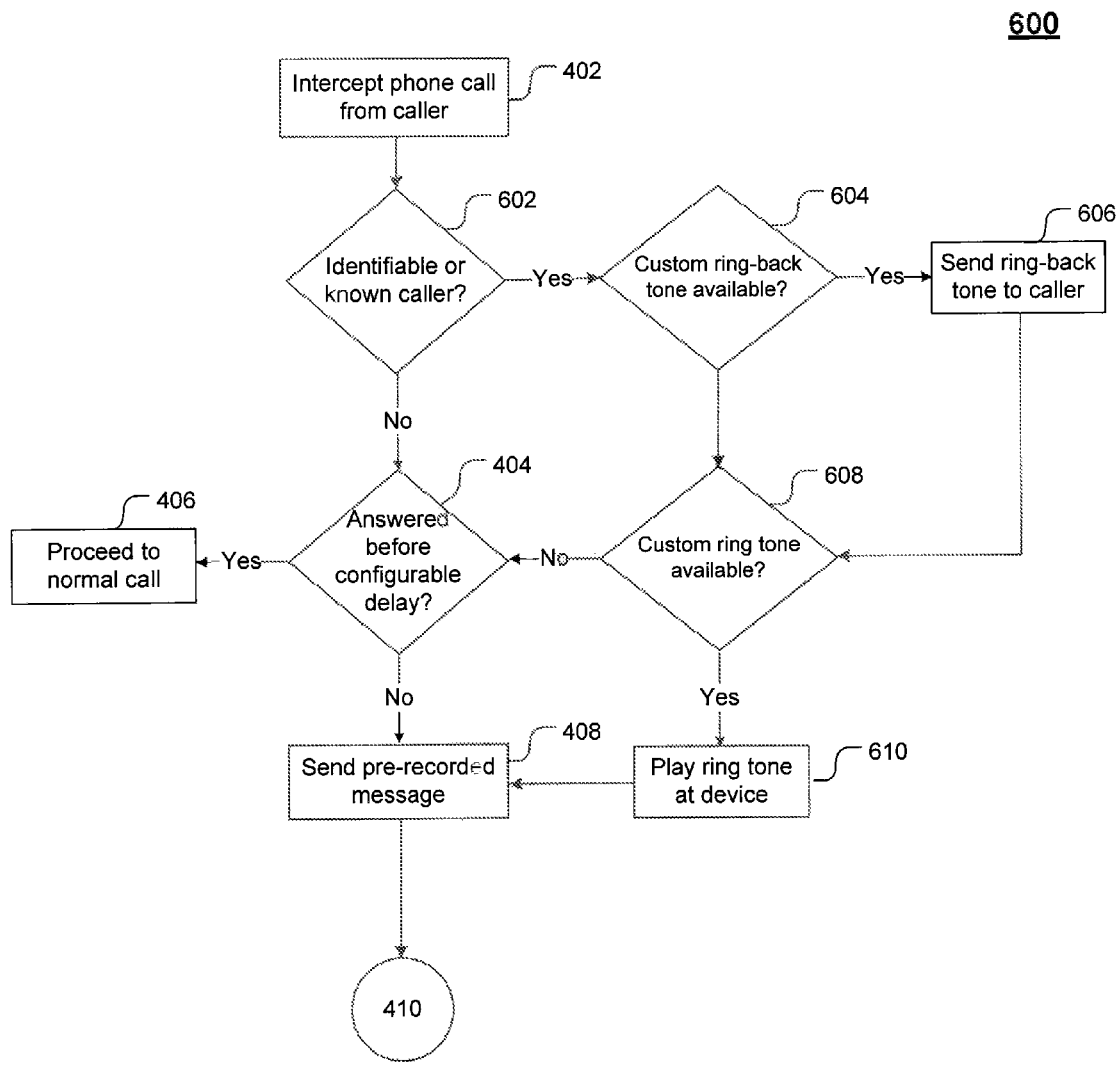
FIG. 6 is a flowchart of an embodiment of an exemplary method for playing a custom ring-back and a custom ring tone for an identifiable or known caller at a computing device.

FIG. 6 is a process flowchart of a method 600 for intercepting a phone call from a caller at a computing device (e.g., a mobile phone as used in method 400), according to an embodiment. Method 600 includes steps 602, 604, 606, 608, and 610 in addition to steps 402, 404, 406, 408, and 410 of method 400 of FIG. 4. Like method 400, method 600 begins in step 402, in which a call from a caller is intercepted (e.g., by communication request handler 210 of FIG. 2). Method 600 then proceeds to step 602, which includes determining whether the caller is an identifiable or known caller. If it is determined in step 602 that the caller is not an identifiable or known caller, method 600 proceeds to steps 404, 406, and 408 as in method 400 described above. If the caller is an identifiable or known caller, method 600 proceeds to step 604, which includes determining whether a custom ring-back tone is available for the identifiable or known caller. If a custom ring-back tone is available, method 600 proceeds to step 606, which includes sending the custom ring-back tone to the identifiable or known caller. From either step 604 or step 606, method 600 proceeds to step 608, which includes determining whether a custom ringtone is available for the identifiable or known caller. If it is determined in step 608 that no custom ringtone is available for the identifiable or known caller, method 600 proceeds to steps 404, 406, and 408 as in method 400 described above. If it is determined in step 608 that a custom ringtone is available, method 600 proceeds to step 610, which includes playing the ringtone at the computing device (e.g., a mobile phone). Method 600 then proceeds to step 408, which includes sending a prerecorded message to the identifiable or known caller. After step 408, method 600 concludes at step 410 of method 400. The steps of method 600 may be performed by, for example, communication request handler 210 as described above.

Returning to FIG. 4, method 400 proceeds to step 410, which includes recording an incoming audio message from the caller. Step 410 may be performed by, for example, recorder 310 of FIG. 3. As described above, the audio message may be recorded and stored locally at the device, as in step 412, according to an embodiment. In another embodiment, also described above, the audio message may be recorded and stored at a cloud-based storage location, as in step 414. Embodiments of method 400 may include a step 416, which involves converting the recorded audio message into text metadata and annotating the recorded audio message with the text metadata. Step 416 may be performed by, for example, translator 320 of FIG. 3. The annotated audio message may be stored locally at the device as in step 412 or in cloud-based storage as in step 414, according to an embodiment. In an embodiment, step 416 may be performed by an application at the device (e.g., voicemail application 250 of FIG. 2, as described above) or performed external to the device as a cloud-based service.

Next, method 400 proceeds to step 418, in which the call from the caller is completed (e.g., the phone call is disconnected). In an embodiment, method 400 may then proceed to step 420, which involves sending a notification of the voicemail message to the user. Step 420 may be performed by voicemail manager 220 of FIG. 2, which may utilize display 240 of FIG. 2 to display the notification. In an embodiment, method 400 concludes at step 422, which involves sending the recorded voicemail message from local storage or cloud-based storage, as described above, to a voicemail application (e.g., voicemail application 250 of FIG. 2). Step 422 may be performed by, for example, voicemail manager 220 of FIG. 2.

B. Intercepted Voicemail Notifications

Figure 7:
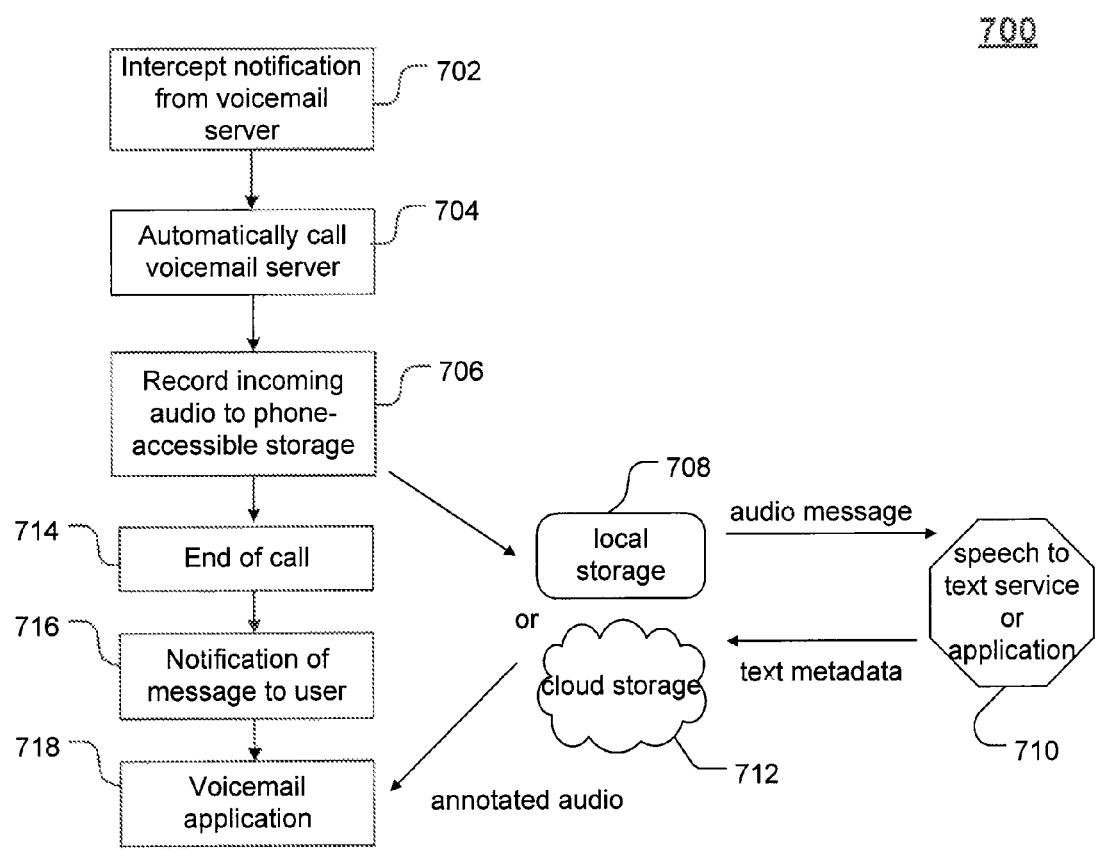
FIG. 7 is a flowchart of an embodiment of an exemplary method for enabling voicemail features at a computing device upon intercepting a voicemail notification from a voicemail server at a computing device.

FIG. 7 is a process flowchart of a method 700 for enabling voicemail features at a computing device upon intercepting a voicemail notification from a voicemail server at the computing device, according to an embodiment. Method 700 includes steps 702, 704, 706, 708, 719, 712, 714, 716, and 718.

For ease of explanation, system 100 of FIG. 1, as described above, will be used to describe method 700, but is not intended to be limited thereto. Further, for ease of explanation, method 700 will be described in the context of a mobile phone device (e.g., computing device 110 of FIG. 1). The mobile phone device is communicatively coupled to a voicemail server (e.g., voicemail server 140 of FIG. 1) via a communications network (e.g., network 120 of FIG. 1). Based on the description herein, a person of ordinary skill in the relevant art will recognize that method 700 can be executed on other types of client devices such as, for example and without limitation, a PDA, a laptop or personal computer, and similar types of devices capable of receiving voicemail notifications via a communications network. These other types of client devices are within the scope and spirit of the embodiments described herein.

Method 700 begins in step 702, which includes intercepting a voicemail notification from a voicemail server. Method 700 proceeds to step 704, which includes automatically calling the voicemail server to retrieve the voicemail message. Steps 702 and 704 may be performed by, for example, communication request handler 210 of FIG. 2. Next, method 700 proceeds to step 706, which includes recording the incoming audio message at the device. In an embodiment, the incoming audio message may be stored locally at the device, as in step 708. In another embodiment, the incoming audio message may be stored in an external cloud-basted storage location, as in step 712. Steps 706, 708, and 712 may be performed by, for example, recorder 310 of FIG. 3.

Embodiments of method 700 may include a step 710, which involves converting the recorded audio message into text metadata and annotating the recorded audio message with the text metadata. Step 710 may be performed by, for example, translator 320 of FIG. 3. The annotated audio message may be stored locally at the device as in step 708 or in cloud-based storage as in step 712, according to an embodiment. In an embodiment, step 710 may be performed by an application at the device (e.g., voicemail application 250 of FIG. 2, as described above) or performed external to the device as a cloud-based service.

Next, method 700 proceeds to step 714, in which the call from the caller is completed (e.g., the phone call is disconnected). In an embodiment, method 700 may then proceed to step 716, which involves sending a notification of the voicemail message to the user. Step 716 may be performed by voicemail manager 220 of FIG. 2, which may utilize display 240 of FIG. 2 to display the notification. In an embodiment, method 700 concludes at step 718, which involves sending the recorded voicemail message from either local storage or cloud-based storage, as described above, to a voicemail application (e.g., voicemail application 250 of FIG. 2). Step 718 may be performed by, for example, voicemail manager 220 of FIG. 2.

One advantage of intercepting communication requests according to the example of step 402 in method 400 of FIG. 4 is to have immediate storage and access (step 410) and access to further voicemail features (step 422) independent of carrier voicemail support.

V. EXAMPLE COMPUTER SYSTEM IMPLEMENTATION

Embodiments shown in FIGS. 1-7, or any part(s) or function(s) thereof, may be implemented using hardware, software modules, firmware, tangible computer readable media having instructions stored thereon, or a combination thereof and may be implemented in one or more computer systems or other processing systems.

Figure 8:
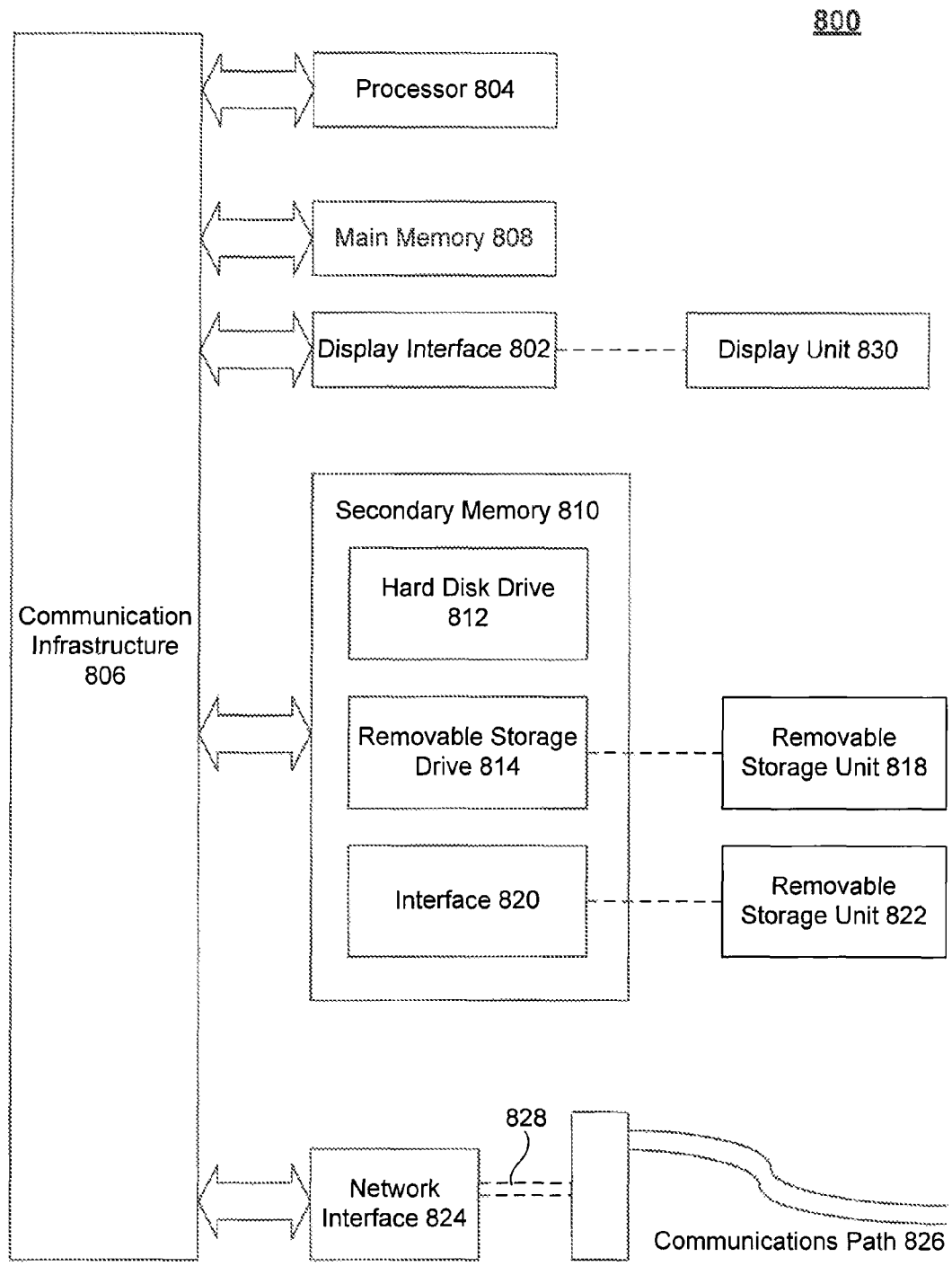
FIG. 8 is a diagram of an example computer system in which embodiments can be implemented.

FIG. 8 illustrates an example computer system 800 in which embodiments, or portions thereof, may by implemented as computer-readable code. For example, computing device 110 in FIGS. 1 and 2, can be implemented in computer system 800 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 800. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art, removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Computer program medium and computer usable medium may also refer to memories, such as main memory 808 and secondary memory 810, which may be memory semiconductors (e.g. DRAMs, etc.).

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor device 804 to implement the processes of the present invention, such as the stages in the methods illustrated by flowcharts 400, 500, 600, and 700 of FIGS. 4, 5, 6, and 7, respectively, discussed above. Accordingly, such computer programs represent controllers of the computer system 800. Where the invention is implemented using software, the software may be stored in a computer program product and loaded into computer system 800 using removable storage drive 814, interface 820, and hard disk drive 812, or communications interface 824.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

VI. CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for enabling voicemail features locally at a phone coupled to a carrier network, comprising:
   receiving at the phone a phone call from a caller;
   in response to receiving the phone call from the caller, determining whether the caller is an identifiable or known caller;
   intercepting at the phone the received phone call, wherein the intercepting occurs before the phone call is directed to the carrier voicemail system;
   automatically, without user intervention, sending a prerecorded message from the mobile phone to the caller after a configurable time-delay has elapsed;
   automatically, without user intervention, recording an incoming audio message from the caller;
   transcribing the recorded audio message, the transcribing including
   generating, using the recorded audio message, a text transcription and text metadata relating to one or more playback features at the phone;
   annotating the recorded audio message with the text transcription and text metadata, wherein at least a portion of the audio message is associated with the text transcription and text metadata; and
   storing the recorded audio message annotated with the text transcription and the text metadata at a local data store of the phone, independent of the carrier voicemail system, wherein the recorded audio message is available to an application with voicemail functionality executable by the phone.

2. The method of claim 1, wherein the sending comprises:
   detecting whether a caller-specific message is available for the identifiable or known caller based on the determining; and
   sending the caller-specific message from the phone to the identifiable or known caller after the configurable time-delay has elapsed based on the detecting.

3. The method of claim 1, wherein the receiving further comprises:
   detecting whether a ring-back tone and ring tone are available for the identifiable or known caller based on the determining;
   transmitting the ring-back tone to the identifiable or known caller based on the detecting; and
   playing the ring tone at the phone based on the detecting.

4. The method of claim 1, further comprising:
   sending the recorded audio message annotated with the text transcription and the text metadata after transcribing to an application with voicemail functionality executable by the phone.

5. The method of claim 1, wherein the transcribing occurs locally at the phone.

6. The method of claim 1, wherein the transcribing occurs at one or more cloud-based computing devices.

7. The method of claim 1, wherein the storing further comprises:
storing the annotated audio message at the local data store of the phone.

8. The method of claim 7, further comprising:
graphically displaying at the phone the text transcription of the annotated recorded audio message based on the text metadata.

9. The method of claim 8, further comprising:
graphically displaying at the phone a visual progress marker based on the text metadata indicating at least one word in the graphically displayed transcribed text during playback of the annotated recorded audio message.

10. The method of claim 8, further comprising:
graphically displaying at the phone a timeline illustrating a word distribution of the text transcription based on the recorded audio message annotated with the text transcription and the text metadata.

11. A system for enabling voicemail features locally at a phone coupled to a carrier network, comprising:
a communication request handler configured to receive at the phone a phone call from a caller, in response to receiving the phone call from the caller, determine whether the caller is an identifiable or known caller, intercept at the phone the received phone call, and to automatically, without user intervention, send a prerecorded message from the phone to the caller after a configurable time-delay has elapsed; and
a voicemail manager comprising:
a recorder to automatically, without user intervention, record an incoming audio message from the caller; and
a translator configured to transcribe the recorded audio message, and further configured to generate, using the recorded audio message, a text transcription and text metadata relating to one or more playback features at the phone, annotate the recorded audio message with the text metadata, wherein at least a portion of the audio message is associated with the text transcription and text metadata, and store the recorded audio message annotated with the text transcription and the text metadata at a local data store of the phone, wherein the recorded audio message is available to an application with voicemail functionality executable by the phone.

12. The system of claim 11, wherein the communication request handler, in response to interception of the phone call, is further configured to detect whether a caller-specific message is available for the identifiable or known caller based on the determination, and further configured to send the caller-specific message, based on the detection, from the phone to the identifiable or known caller after the configurable time-delay has elapsed.

13. The system of claim 11, wherein the communication request handler, in response to interception of the phone call, is further configured to detect whether a ring-back tone and a ringtone are available for the identifiable or known caller based on the determination, further configured to transmit the ring-back tone to the identifiable or known caller based on the detection, and further configured to play the ring tone at the phone based on the detection.

14. The system of claim 11, wherein the voicemail manager is further configured to send the recorded audio message annotated with text transcription and text metadata to an application with voicemail functionality executed at the phone.

15. The system of claim 11, wherein the translator is configured to execute locally at the phone.

16. The system of claim 11, wherein the translator is configured to execute as a cloud-based service.

17. The system of claim 11, wherein the translator is further configured to store the recorded audio message annotated with the text transcription and the text metadata at the local data store of the phone.

18. The system of claim 17, wherein the translator is further configured to graphically display at the phone a text transcription of the recorded audio message based on the text metadata.

19. The system of claim 18, wherein the translator is further configured to graphically display at the phone a visual progress marker indicating at least one word in the graphically displayed transcribed text during playback of the recorded audio message.

20. The system of claim 18, wherein the translator is further configured to graphically display at the phone a timeline illustrating a word distribution of the transcribed text based on the recorded audio message annotated with the text transcription and the text metadata.

21. A method for enabling voicemail features locally at a phone coupled to a carrier network, comprising:
receiving at a phone a phone call from a caller;
determining whether the caller is an identifiable or known caller;
intercepting at the phone the received phone call;
automatically, without user intervention, sending a prerecorded message from the phone to the caller after a configurable time-delay has elapsed;
automatically, without user intervention, recording an incoming audio message from the caller;
transcribing the recorded audio message, at the phone, to obtain a text transcription;
storing the recorded audio message and text transcription at a local data store of the phone, wherein the recorded audio message is available to an application with voicemail functionality executable by the phone; and
graphically displaying at the phone a visual progress marker indicating a location of at least one word in the text transcription during play back of the recorded audio message.

22. The method of claim 21, wherein the receiving further comprises:
in response to receiving the phone call from the caller,
comparing a phone number of the caller to a list of contacts stored at the phone; and
comparing a phone number of the caller to a list of contacts stored at the phone; and
determining whether the caller is an identifiable or known caller, based on the phone number of the caller matching a phone number of a contact in the list of contacts, and wherein the sending comprises;
detecting whether a caller-specific message is available for the identifiable or known caller based on the determining; and
sending the caller-specific message from the phone to the identifiable or known caller after the configurable time-delay has elapsed on the detecting.

23. The method of claim 21, wherein the receiving further comprises;
in response to receiving the phone call from the caller,
comparing a phone number of the caller to a list of contacts stored at the phone;

determining whether the caller is an identifiable or known caller, based on the phone number of the caller matching a phone number of contact in the list of contacts;

detecting whether a ring-back tone and ring tone are available for the identifiable or known caller based on the determining;

transmitting the ring-back tone to the identifiable or known caller based on the detecting; and playing the ring tone at the phone based on the detecting.

24. The method of claim 21, further comprising:

sending the recorded audio message and text transcription to a voicemail application executable by the phone.

25. The method of claim 21, wherein the transcribing further comprises:

generating text metadata of the recorded audio message, the text metadata including information related to translated text corresponding to each word spoken in the recorded audio message.

26. The method of claim 25, further comprising:

graphically displaying at the phone the text transcription of the recorded audio message based on the text metadata.

27. The method of claim 26, further comprising:

graphically displaying at the phone a timeline illustrating a word distribution of the graphically displayed text transcription, wherein the timeline identifies a position of word of the text transcription relative to the recorded audio message.

28. A system for enabling voicemail features locally at a phone coupled to a carrier network, comprising:

a communication request handler to receive at the phone a phone call from a caller, to determine whether the caller is an identifiable or known caller, to intercept at the phone the received phone call, and to automatically, without user intervention, send a prerecorded message from the phone to the caller after a configurable time-delay has elapsed; and a voicemail manager comprising:

a recorder to automatically, without user intervention, record an incoming audio message from the caller; and a translator configured to transcribe the recorded audio message, at the phone to obtain a text transcription, store the transcribed audio message to a local data store of the phone wherein the local data store is available to an application with voicemail functionality executable by the phone, and graphically display at the phone a visual progress marker indicating at a location of at least one word in the text transcription during playback of the recorded audio message.

29. The system of claim 28, wherein the communication request handler, in response to interception of the phone call, is further configured to compare a phone number of the caller to a list of contacts stored at the phone and determine whether the caller is an identifiable or known caller, based on the phone number of the caller matching a phone number of a contact in the list of contacts, further configured to detect whether a caller-specific message is available for the identifiable or known caller based on the determination, and further configured to send the caller-specific message, based on the detection, from the phone to the identifiable or known caller after the configurable time-delay has elapsed.

30. The system of claim 28, wherein the communication request handler, in response to interception of the phone call, is further configured to compare a phone number of the caller to a list of contacts stored at the phone and determine whether the caller is an identifiable or known caller, based on the phone number of the caller matching a phone number of a contact in the list of contacts, further configured to detect whether a ring-back tone and a ringtone are available for the identifiable or known caller based on the determination, further configured to transmit the ring-back tone to the identifiable or known caller based on the detection, and further configured to play the ring tone at the phone based on the detection.

31. The system of claim 28, wherein the voicemail manager is further configured to send the recorded audio message and text transcription to an application with voicemail functionality executed at the phone.

32. The system of claim 28, wherein the translator is configured to generate text metadata of the recorded audio message, the text metadata including information related to translated text corresponding to each word spoken in the recorded audio message.

33. The system of claim 32, wherein the translator is further configured to graphically display at the phone the text transcription of the recorded audio message based on the text metadata.

34. The system of claim 33, wherein the translator is further configured to graphically display at the phone a timeline illustrating a word distribution of the graphically displayed text transcription, wherein the timeline identities a position of word of the text transcription relative to the recorded audio message.

35. The system of claim 28, wherein the phone is one of the group consisting of: a mobile phone and a smart phone.

* * * * *